Oct. 11, 1960 H. H. ABELEW 2,956,151

RADIO RECEIVER WITH MEANS TO DETECT SIGNALS BELOW NOISE LEVEL

Filed March 1, 1955 2 Sheets-Sheet 1

INVENTOR.
H. H. ABELEW
BY
R P Morris
ATTORNEY

Oct. 11, 1960 H. H. ABELEW 2,956,151

RADIO RECEIVER WITH MEANS TO DETECT SIGNALS BELOW NOISE LEVEL

Filed March 1, 1955 2 Sheets-Sheet 2

INVENTOR.

H. H. ABELEW

BY R.P. Morris

ATTORNEY

United States Patent Office 2,956,151

Patented Oct. 11, 1960

2,956,151

RADIO RECEIVER WITH MEANS TO DETECT SIGNALS BELOW NOISE LEVEL

Harry H. Abelew, Brooklyn, N.Y., assignor to Mackay Radio and Telegraph Company, New York, N.Y., a corporation of Maryland Filed Mar. 1, 1955, Ser. No. 491,444

20 Claims. (Cl. 250—20)

This invention relates to a radio receiver adapted to receive signals of predetermined characteristics and more particularly to a receiver for receiving the desired signals in the presence of ambient noise having a greater amplitude than the signals.

More specifically, this invention relates to a receiver which is controlled by a novel automatic-gain-control circuit.

In radio communication, there are instances when it is possible to transmit and receive information using the simplest type of code technique. For example, a warning signal may be of the type having only two characteristics: on for a given duration and off for a given duration.

As applied to marine radio communication, a stricken ship transmits the classic "S O S" signal preceded by an International Auto Alarm signal on the 492 to 508 kc. International Distress Channel and which will indicate to a ship receiving the auto alarm signals that a plea for help will ensue. The arrangement is such that the alarm signals actuate bells or other warning devices which serve to call radio operators to their respective posts in anticipation of the receipt of a distress call which follows the alarm signals.

The International Auto Alarm signal for marine travel which has been adopted by various countries and approved by the F.C.C., consists of a series of four, four-second dashes separated by one-second intervals. This is a warning signal known to most ocean going vessels. Accordingly, the sole function of the receiver which is adapted to receive the warning signal is to amplify and demodulate the signal and apply the output to operate an alarm. Thus, the receiver may be considered as having only two states, the dash state and the space state. The receiver for optimum performance, should have maximum sensitivity, compatible with the minimum number of false calls. False calls in an auto-alarm receiver can result from spurious telegraph signals and atmospheric noises which fall within the tolerances allotted to the auto-alarm signal. The effect of interference during the reception of a desired warning signal results in filling in the spaces between the dashes or blocking the receiver. Either effect prevents proper reception of the signal.

Since the approved auto-alarm circuits must be capable of receiving signals from 100 microvolts to 1 volt, the auto-alarm signals are usually of lesser amplitude than the peak noise voltage. This results in the spaces being filled by noise voltage and consequent masking of the signals.

The noise energies which interfere with the reception of warning signals may be categorized as:

(1) Fluctuating atmospheric noise,
(2) Impulsive atmospheric noise, and
(3) Telegraph interference.

Fluctuating atmospheric noise is characterized by irregular, slowly varying wave fronts. Over an interval of milliseconds, this noise represents an average current to the input of the receiver. Such noise masks the signal whose amplitude is below the trough of the noise voltages. Thus, the receiver should be equipped to adjust its gain automatically to allow recognition of auto-alarm signals of amplitude slightly above the average level of the fluctuating noise. Impulsive noise is characterized by intense, steep discontinuous wave fronts. At maximum gain and with no amplitude limiting, the receiver will be blocked by the peaks having sufficient amplitude. Telegraph interference usually is of such nature that there are several gaps of the order of 10 milliseconds during each second of reception. The space intervals between dashes may be reduced to 10 milliseconds, in accordance with auto-alarm standards, and therefore such spaces may be detected during the gaps in the telegraph interference. Thus, in the presence of ambient noise voltage having high amplitude relative to the warning signal, there must be some means of compensating for the effect of the ambient noise voltages, otherwise the ambient noise will block the receiver and thereby prevent the reception of the wanted auto-alarm signals.

Heretofore, auto-alarm receivers have employed no automatic sensitivity controls. Consequently, the sensitivity of the known receivers are low, usually ranging from 300 to 1000 microvolts. Further, the recovery time from blocking of the known receivers, is relatively long with consequent lengthening of noise pulses. This results in poor performance in the presence of impulsive noises.

Accordingly, it is an object of this invention to provide a receiver having a novel automatic-gain-control circuit (AGC) which increases the receiver sensitivity to a greater extent than the known receivers, and which is capable of rapid recovery from blocking.

It is a further object of this invention to provide a novel form of AGC circuit which variably controls the sensitivity of the receiver in response to the ambient noise.

It is a further object of this invention to provide an auto-alarm receiver capable of operating in the presence of ambient noise and which detects the presence of gaps in the ambient noise, whereby the absence of gaps over a given period of time indicates the reception of an auto-alarm signal.

In accordance with an aspect of this invention, there is provided a receiver of the type which is capable of detecting signals of given duration in the presence of ambient noise voltages; the waveform of the noise voltages exhibiting gaps of greater duration towards the peaks than at the base thereof. The invention is characterized by AGC means operative in response to the noise energy for reducing the sensitivity of the receiver to a given threshold value; the threshold value being at a level at which the gaps are detectable. The receiver is operated at the threshold level and an absence of gaps for a period equal to the duration of a warning signal is indicative of the reception of such warning signal.

The above-mentioned and other features and objects of this invention and the manner of attaining them will become more apparent and the invention itself will be best understood, by reference to the following description of two embodiments of the invention taken in conjunction with the accompanying drawings, wherein.

Figure 1:
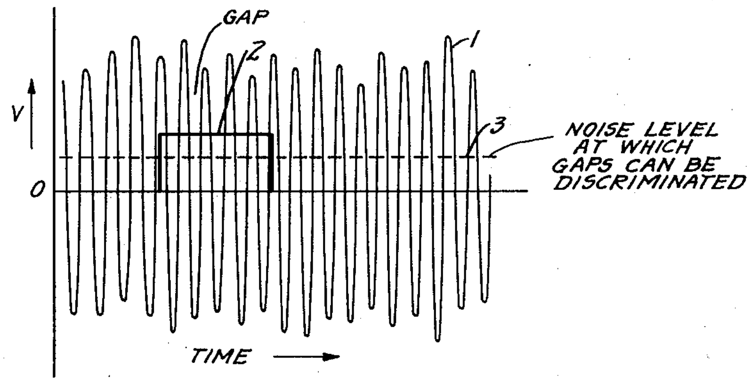
Fig. 1 is a time-voltage graph of the ambient noise waveform, the threshold level at which the receiver can detect gaps in the waveform, and the super-position of a part of a wanted signal on the noise waveform.

Before describing the structural details of the invention, it would be helpful if first the principle of the invention was understood. It must be realized that noise voltages, as described above, are always present in the atmosphere. The noise wave form at the input to the receiver is a complex envelope form (Fig. 1). However, the gaps discerned by the receiver, after the input wave form is detected, is the form shown in Fig. 1 above the time axis. The wanted signal, or which will be referred to hereinafter as the "warning" signal, comprises four separated dashes, which are superimposed on the noise voltage; one dash 2 of the warning signal is shown in Fig. 1. As seen in the figure, the peak amplitude of the noise voltage is greater than the maximum amplitude of the auto-alarm signal. This is usually true in practice. Therefore, if a conventional form of AGC circuit was employed, the receiver would be continuously blocked since the conventional AGC circuit is controlled by the peak amplitudes of the incoming energy. The nature of the noise energies has been calculated and it is known that towards the base of the noise energy, there are practically no gaps and thus the noise may be considered as continuous, whereas towards the peaks of the noise voltage, gaps are present and may be detected. Thus, there is a level, which will hereinafter be referred to as a threshold level, above which gaps are detectable. In accordance with the invention, the receiver is desensitized automatically so that it is operating at the threshold level 3, and the receiver is capable of detecting gaps in the noise voltage. The peaks of the noise voltage block the receiver momentarily, however the recovery time of the receiver is very rapid and less than the duration of the gap. Therefore, the receiver is intermittently blocked and unblocked during the absence of a warning signal, however, upon receiving the signal the receiver is blocked for a period equal to the duration of the signal. This absence of detecting a gap for the prescribed period is an indication of receiving a warning signal.

Figure 2:
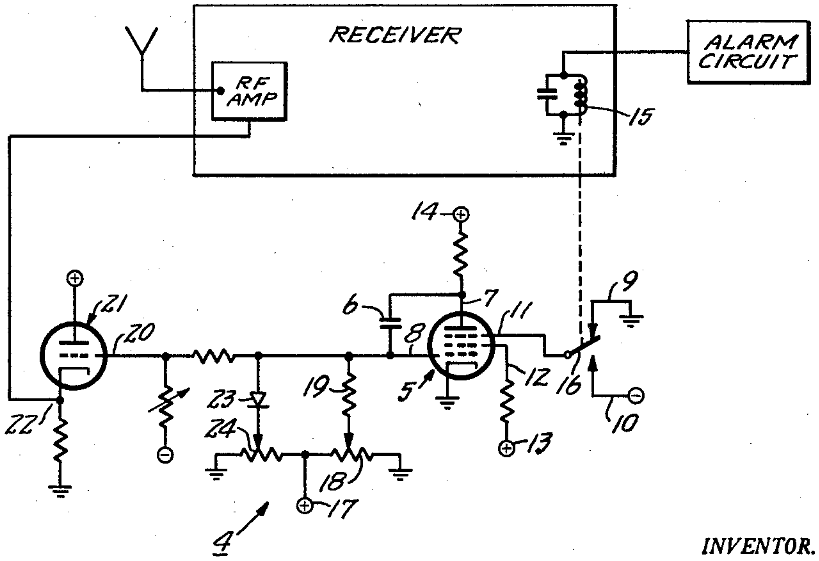
Fig. 2 is an illustration of the invention showing the receiver in block diagram and a first embodiment of the AGC circuit.

Referring now to Fig. 2, there is shown a receiver in block diagram which comprises the customary radio-frequency (R.-F.) stages, detector stages, preferably an audio frequency stage for aural monitoring and an output stage which feeds an alarm circuit. An AGC circuit, generally indicated at 4, is coupled between the output of the receiver and the input of the R.-F. stages of the receiver.

Broadly, the AGC circuit is a generator of a negative saw-tooth voltage which constitutes the biasing voltage applied to the R.-F. stages. It is essential however, for rapid receiver recovery that the biasing voltage decrease much more rapidly than it increases, or in other words, that the leading edge of the saw-tooth voltage have a longer time base than the trailing edge. If the receiver is operating below threshold level, the biasing voltage increases in a negative sense at a constant rate, and upon detection of a gap, the biasing voltage decreases at a constant rate which is much faster than the increasing rate. The rates of increase and decrease are adjusted so that for a predetermined number of signal gaps per second, the receiver sensitivity is approximately maximum. If the number of signal gaps per second is less than the predetermined number, then the receiver is operating below the threshold level and the biasing voltage is increased automatically, decreasing the sensitivity of the receiver, until the receiver is capable of detecting the predetermined number of gaps per second. At that point, the biasing voltage is stabilized as long as the conditions of interference remain unchanged.

The biasing voltage source can be any suitable saw-tooth generator having a tolerable degree of non-linearity. One example of a linear saw-tooth generator is the Miller Integrator Circuit, shown in Fig. 2. This circuit comprises basically an electron tube 5, preferably a pentode, a capacitor 6 coupled between the anode 7 and control grid of the tube 5, and a pair of biasing voltage sources 9 and 10. The operation of this circuit is determined by the voltage applied to the suppressor grid 11 of the tube 5. The pentode 5 is preferably a gated beam tube having its screen grid 12 and its anode 7 coupled to suitable sources of positive potential 13 and 14. One mode of varying the potential on the grid 11 is by means of relay 15 energized by the receiver output. The relay 15 controls the position of movable contact 16 so that the grid 11 is selectively connected to either ground 9 or source of voltage 10. Ground 9, which is positive relative to the voltage from source 10 renders pentode 5 conducting, and voltage from source 10 cuts-off the pentode. Assuming the receiver is operating below threshold level and the noise voltage is continuous, the relay 15 is energized, moving contact 16 to the source of negative potential and thereby blocking the tube 5. Operation of tube 5 completes a charging circuit for capacitor 6, from positive source of potential 14, capacitor 6, resistors 19 and 18, to ground. Thus, the rate of charge is determined predominantly by the values of the resistors 18, 19, capacitor 6 and the capacity between grid 8 and cathode of tube 5. The pentode 5 can be regarded as a tube presenting from grid 8 to cathode a capacitance whose effective value depends on the gain of the pentode. The voltage applied to grid 8 of tube 5 varies the plate-grid transconductance, thereby varying the gain and the effective capacitance developed by the tube. The variation in the effective capacitance determines in part the different charge and discharge rates. The voltage developed across capacitor 6 which is positive relative to ground is applied to the grid circuit 20 of a cathode follower amplifier 21. The output from the cathode 22 of the cathode follower amplifier 21 follows the waveform developed across capacitor 6, and constitutes biasing voltage applied to the R.-F. stages.

It is preferable to utilize a cathode follower as the source of delivering directly the biasing voltage because it is a low impedance device having a very short time-constant and follows the condition of the R.-F. stages very rapidly. Moreover, it is necessary to maintain the time-constants of the grid-cathode circuits of the R.-F. stages as short as practical, to permit rapid recovery from receiver blocking.

The slope of the leading edge of the saw-tooth waveform is relatively small and may be at the rate of 10 db per minute. As described above, the biasing voltage is applied until the receiver is capable of detecting gaps, at which time the relay 15, in the output circuit of the receiver, moves the contact 16 to connect grid 11 to ground and thereby render the tube 5 conducting. Since it is essential that the recovery time of the receiver be as rapid as possible, it is necessary that the time-constant of the discharge circuit be as small as possible. Therefore, the discharge circuit of capacitor is through tube 5 to ground. The rate of discharge is preferably of the order of 40 db per minute. Referring for a moment to Fig. 1, if any one of the peaks 1 blocked the receiver, the receiver operating at the threshold level 3 would be capable of detecting the succeeding gap because the recovery time of the receiver is less than the time interval of the gap. These considerations determine the values of the capacitors and resistors used.

The rectifier 23 maintains the biasing voltage on grid 8 constant because as the charge accumulates on capacitor 6 tending to reduce the rate of conduction of tube 5, the resistance of rectifier 23 decreases tending to maintain the grid current constant.

The tube 5 therefore is continuously blocked until the receiver attains the threshold level 3 (Fig. 1) and at that level is rendered alternatively conducting and non-conducting in response to the peaks exceeding the threshold level of the receiver. Due to the inherent time-delays in the circuit, the saw-tooth voltage hunts slightly above and below the threshold of operation.

The presence of the auto-alarm signal is made evident by the absence of gaps for the prescribed period. For example, the receiver operating at the threshold level is capable of detecting gaps and when there is an absence of gaps over a period defining a pattern of dash and space signals, then it is known that the receiver is receiving an auto-alarm signal.

Figure 3:
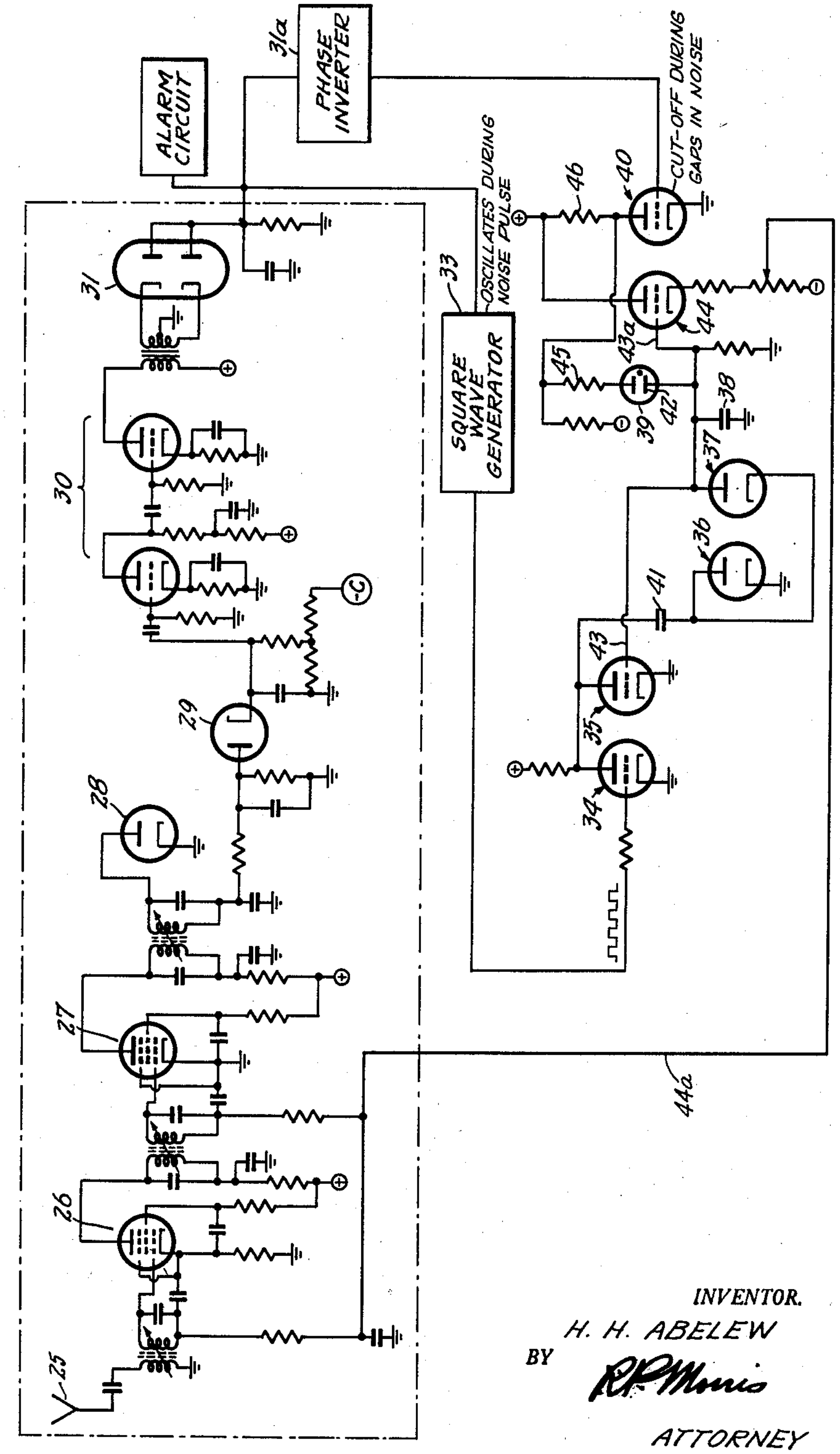
Fig. 3 is a schematic diagram of the receiver including an alternative embodiment of the AGC circuit.

Referring now to Fig. 3, there is shown in schematic diagram a suitable receiver shown in block diagram in Fig. 2. The receiver comprises an antenna 25 over which the input energy is coupled to two R.–F. stages 26, 27. The R.–F. energy is detected by diode 28, limited by diode 29 and coupled to two stages of audio-frequency amplification 30. The audio-frequency stages may be provided for aural monitoring if it is desired. If no such monitoring is desired, these stages may be eliminated and the output from the limiter 29 may be coupled directly to the alarm circuit. In Fig. 3, the block diagram for the alarm circuit includes the relay circuit which is not specifically shown. However, when utilizing the audio-frequency stages 30, it is necessary to rectify the audio-frequency signals at 31 for operation of the relay. The alarm circuit is coupled to the output of the receiver as shown.

An alternative embodiment of the saw-tooth generator is shown in Fig. 3. In this embodiment, the output from the rectifier 31, is applied to and triggers into operation a square wave generator 33, which may be any suitable form of pulse generator, such as a multivibrator.

The saw-tooth generator comprises generally a pulse amplifier 34, a variable-bleeder resistor in the form of an electron tube 35, limiting diodes 36, 37, capacitor 38 and its control circuit comprising a gas discharge tube 39 and an electron tube 40. The positive square waves are applied to amplifier 34 which sharpens the flanks and increases the amplitude of the pulses. The amplified pulses are coupled via a capacitor 41 to diodes 36 and 37. The positive half of the pulses are shunted to ground via diode 36 and the negative halves cause diode 37 to conduct. Conduction of diode 37 charges capacitor 38 so that its negative electrode is coupled to electrode 42 of gas discharge tube 39. The gas discharge tube is preferably a miniature type neon tube. The negative electrode of capacitor 38 is also coupled to the grid 43 of triode 35. Tube 35 is employed because the square wave output of tube 34 charges capacitor 38 negative and if the gain of tube 34 remains constant, the charging pulses applied to capacitor 38 are constant in amplitude and as the voltage across capacitor 38 builds up, each successive input pulse results in a progressively smaller increase of voltage across capacitor 38. Consequently, if the gain of tube 34 is constant, the voltage across capacitor 38 would be built up along an exponential curve. Tube 35 is connected to function as a variable bleeder across the plate supply to tube 34. As the charge build-up on capacitor 38 increases negatively, the resistance represented by tube 35 increases, since grid 43 is connected to the negative plate of capacitor 38 and hence the gain of tube 34 increases progressively. Consequently, the charging pulses applied to capacitor 38 increase in amplitude as the charge on the capacitor increases, thereby resulting in a more nearly linear accumulation on capacitor 38.

The charge on capacitor 38 continues to build-up in time-correspondence with the noise voltage. This build-up constitutes the leading edge of the saw-tooth voltage, and is applied to the grid **43*a* of a cathode-follower amplifier 44. The output from the cathode-follower is coupled to the R.–F. stages via lead 44*a*** as in the embodiment of Fig. 2.

Although a negative voltage is applied to one electrode of the gas-discharge tube 39, this voltage is not sufficient to fire the tube, in the absence of full positive potential from B+ being applied to the other electrode. The full B+ is obtained as follows: The output from the receiver is inverted by means of phase inverter **31*a* and applied to triode 40 which conducts in response to the noise voltage. The drop in anode voltage across load resistance 46 is applied over a resistor 45 to the other electrode of the gas-discharge tube 39. Upon detecting a gap in the noise voltage, triode 40 is cut-off and the full positive potential is applied to the other electrode of gas tube 39 which is sufficient together with the negative voltage developed by the capacitor 38, to fire the tube. The discharge of the tube permits capacitor 38** to discharge to ground and the discharge thereof constitutes the trailing edge of the saw-tooth biasing voltage.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. In a radio receiver of the type adapted to detect a signal of given duration in the presence of ambient noise voltage, the waveform of the noise voltage exhibiting gaps of greater duration toward the peaks than at the base thereof, characterized by automatic-gain-control means operative in response to the noise energy for reducing the sensitivity of said receiver to a given threshold value, said threshold value being at a level at which the gaps are detectable, means for detecting the gaps and thereby maintaining the receiver at the threshold level, and means for detecting the absence of gaps at said level, whereby the absence of gaps over a period equal to the duration of the signal indicates the reception of said signal.

2. The receiver according to claim 1, wherein the noise voltage is capable of blocking said receiver intermittently for the duration of each of the peaks exceeding the threshold voltage, and means for unblocking said receiver during each successive gap interval.

3. The receiver according to claim 1, wherein said automatic-gain-control means comprises a generator operable in response to the noise voltage for producing a gradually increasing negative biasing voltage, means utilizing said biasing voltage to gradually desensitize said receiver until said receiver reaches said threshold level of operation, whereby at that lever said receiver is capable of detecting gaps in the noise voltage, and means responsive to said gaps for cutting-off said generator.

4. The receiver according to claim 3, wherein said generator produces a biasing voltage having a saw-tooth waveform, the leading edge of said saw-tooth waveform corresponding to the desensitizing biasing voltage and the trailing edge thereof corresponding to the time it takes said receiver to recover from the blocked state.

5. The receiver according to claim 4, wherein said generator includes a charging and discharging circuit, the time-constants of the charging and discharging circuit determining the time-bases of the leading and trailing edges of the saw-tooth waveform.

6. The receiver according to claim 5 and further comprising a low impedance device coupled between the output of said automatic-gain-control means and the input of said receiver, said low-impedance device together with the input of said receiver having a low time-constant, whereby the receiver follows the output from said gain-control means rapidly.

7. A receiver according to claim 6 wherein said low impedance device comprises a cathode-follower amplifier having its grid circuit coupled to the output of said automatic-gain-control means and its cathode coupled to the input of said receiver.

8. The receiver according to claim 5 wherein said generator comprises an integrator circuit of the type comprising a multi-grid electron tube, a capacitor coupled between the anode and a first of the grids of said tube, the conduction and non-conduction of said tube controlling the charging and discharging of said capacitor, and the voltage developed across said capacitor corresponding substantially to the biasing voltage.

9. The receiver according to claim 8, and further comprising first and second potential sources, means controlled by the noise voltage for coupling a second of said grids selectively to either of said sources, one of said sources having a potential capable of cutting-off said tube and the other having a potential capable of rendering said tube conducting.

10. The receiver according to claim 9, wherein said selective means comprises a relay coupled in the output of said receiver, a relay contact movable to connect either of said sources with said second grid and means energizing the relay in response to the noise voltage, whereby the contact is moved to render said tube conducting.

11. A radio receiver capable of detecting warning signals of given duration in the presence of ambient noise voltage having a greater amplitude than the warning signals, the waveform of the noise voltage exhibiting gaps of greater duration toward the peaks than at the base thereof, said receiver comprising a radio-frequency input stage adapted to receive the warning signals and the noise voltage, an output stage having a relay operative in response to said noise voltage, an automatic-gain-control circuit comprising a multi-grid electron tube, a capacitor coupled between the anode and a first of said grids of said tube, first and second sources of biasing potential, switching means coupling either of said sources to a second of said grids, the potential of one of said sources being capable of cutting-off said tube and the potential of the other source being capable of rendering said tube conducting, means coupling said relay to said switching means, so that the operation of said relay causes said switching means to couple that potential to said tube which renders it conducting, a charging and discharging circuit for said capacitor, the charging circuit having a higher time constant than that of the discharging circuit, means including the conduction of said tube for charging said capacitor and means responsive to the gaps in said noise voltage for discharging said capacitor, the voltage developed across said capacitor having a negative-going saw-tooth waveform, the time base of the leading edge of said saw-tooth voltage corresponding to the duration of the received noise voltage, and means applying said saw-tooth voltage as a biasing voltage to the input of said radio-frequency stage, whereby upon receiving the noise voltage said receiver is continuously and progressively desensitized until a gap in the noise voltage is detected, at which time said relay is deenergized and said tube is cut-off, the level at which the gaps are detectable being a threshold level of receiver operation, the absence of gaps at said level for said given duration indicating the reception of said warning signal.

12. The receiver according to claim 11 wherein the time-constant of said discharge circuit is lower than the noise voltage gap, whereby the receiver is capable of receiving a warning signal during the gap interval.

13. The receiver according to claim 11 and further comprising a low impedance device coupled between said capacitor and the input of said radio-frequency stage, whereby the time-constant of the input of said radio-frequency stage is maintained low so that it may follow rapidly the output of said automatic-gain-control circuit.

14. The radio receiver according to claim 13, wherein said low impedance device comprises a cathode-follower amplifier having its grid circuit coupled to one electrode of said capacitor and its cathode coupled to the input of said radio-frequency stage.

15. A radio receiver capable of detecting warning signals of given duration in the presence of ambient noise voltage having a greater amplitude than the warning signals, the waveform of the noise voltage exhibiting gaps of longer intervals towards the peaks than at the base thereof, said receiver comprising a radio-frequency input stage adapted to receive the warning signals and the noise voltage, an output stage including a pulse generator operative in response to said noise voltage, an automatic-gain-control circuit comprising a capacitor, means operative in response to said pulses for charging said capacitor, said means being operative in time correspondence with the reception of the noise voltage, whereby the charge on said capacitor gradually increases with the continuous reception of noise voltage, the voltage developed across said capacitor having a negative-going saw-tooth waveform, the time base of the leading edge of said saw-tooth voltage corresponding to the duration of the received noise voltage, means applying said saw-tooth voltage as a biasing voltage to the input of said radio-frequency stage, whereby said receiver is continuously and progressively desensitized until a gap in the noise voltage is detected, means operative in response to said gap for discharging said capacitor, the level at which the gaps are detectable being a threshold level of receiver operation and the absence of gaps at said level for said given duration being an indication of the reception of said warning signal.

16. The receiver according to claim 15, wherein said automatic-gain-control circuit further comprises an electron tube having cathode, grid and anode electrodes, means applying said pulses to the grid of said tube, the tube conducting in response thereto, a diode having its cathode coupled to the anode of said tube, means coupling said capacitor to the anode of said diode, whereby the diode conducts in response to the negative portions of the output from said tube and a negative charge accumulates on the capacitor electrode coupled to said diode, and a rapid discharge device operative in response to said gaps for discharging said capacitor.

17. The receiver according to claim 16 wherein said rapid discharge device comprises a gas-discharge tube which fires when the voltage across its terminals reaches a predetermined value.

18. The receiver according to claim 17 and further comprising a second electron tube having cathode, grid and anode electrodes, a source of positive biasing potential coupled to the anode of said second electron tube, means coupling the output from said receiver to the grid electrode of said second electron tube, whereby said tube conducts in response to voltages exceeding said threshold value, means reducing the potential applied to said gas-discharge tube during the conduction of said second electron tube, the reduced potential being insufficient to fire said gas-discharge tube, and means responsive to said gaps for cutting-off said tube, whereby the source of positive potential and the negative charge accumulated on said capacitor fires said gas-discharge tube.

19. The receiver according to claim 18 and further comprising a cathode-follower circuit coupled between the anode of said diode and the input of said radio-frequency stage, the voltage developed across said capacitor being applied to the grid circuit of said cathode-follower and the cathode thereof being coupled to said radio-frequency stage.

20. The receiver according to claim 19 wherein said capacitor has one electrode coupled jointly to the anode of said diode and to an electrode of said gas-discharge tube, and the other electrode of said capacitor being coupled to ground.

References Cited in the file of this patent

UNITED STATES PATENTS

| | | |
|---|---|---|
| 2,104,324 | Hollingsworth | Jan. 4, 1938 |
| 2,137,401 | Hobbie | Nov. 22, 1938 |
| 2,189,925 | Reinken | Feb. 13, 1940 |
| 2,223,995 | Kotowski | Dec. 3, 1940 |
| 2,264,018 | Case | Nov. 25, 1941 |
| 2,507,211 | Manke et al. | May 9, 1950 |
| 2,512,699 | Todd | June 27, 1950 |
| 2,522,130 | Pfleger | Sept. 12, 1950 |
| 2,655,596 | Heeren | Oct. 13, 1953 |

FOREIGN PATENTS

| | | |
|---|---|---|
| 709,327 | Great Britain | May 19, 1954 |